US007831056B2

(12) United States Patent
Nikles et al.

(10) Patent No.: US 7,831,056 B2
(45) Date of Patent: Nov. 9, 2010

(54) HEARING DEVICE WITHOUT REFERENCE CLOCK COMPONENT

(75) Inventors: Peter Nikles, Erlangen (DE); Gottfried Rückerl, Nürnberg (DE); Ulrich Schätzle, Forchheim (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1145 days.

(21) Appl. No.: 11/490,744

(22) Filed: Jul. 21, 2006

(65) Prior Publication Data

US 2007/0025573 A1    Feb. 1, 2007

(30) Foreign Application Priority Data

Jul. 22, 2005 (DE) .................... 10 2005 034 369

(51) Int. Cl.
*H04R 25/00* (2006.01)
(52) U.S. Cl. ........................ 381/312; 381/315
(58) Field of Classification Search ................ 381/312, 381/314, 315, 23.1
See application file for complete search history.

(56) References Cited

U.S. PATENT DOCUMENTS

| 5,276,706 | A | * | 1/1994 | Critchlow | .................... 375/343 |
| 5,276,796 | A | | 1/1994 | Yamada et al. | |
| 6,188,290 | B1 | | 2/2001 | Fallisgaard et al. | |
| 6,839,447 | B2 | | 1/2005 | Nielsen et al. | |
| 2004/0037442 | A1 | | 2/2004 | Nielsen et al. | |
| 2005/0100182 | A1 | * | 5/2005 | Sykes et al. | .................. 381/312 |

OTHER PUBLICATIONS

Patent Abstracts of Japan Publication No. 10022988 A—Jan. 23, 1998.

* cited by examiner

*Primary Examiner*—Brian Ensey
(74) *Attorney, Agent, or Firm*—Schiff Hardin LLP

(57) ABSTRACT

A hearing device, in particular a hearing aid, occupies a small volume and has high data transmission speeds for wireless transmission. In order to avoid using large volume frequency-stable components, for this purpose, an oscillator unit with a free-running oscillator is used instead. A receiver receives a synchronization signal cyclically. This is correlated to a reference signal in a correlator, such that the arrival time of the synchronization signal can be defined exactly. The free-running oscillator is then retuned correspondingly.

7 Claims, 1 Drawing Sheet

HEARING DEVICE WITHOUT REFERENCE CLOCK COMPONENT

BACKGROUND OF THE INVENTION

1. Field of the Invention

The present invention relates to a hearing device, in particular a hearing aid, of the type having a data transmission unit to receive a synchronization signal and an oscillator unit to clock the data transmission unit.

2. Description of the Prior Art

There is generally a need for fast and wireless data transmission to and from hearing aids, i.e., to and from the audio signal processing circuit therein. It should be possible to provide all hearing aid types from the large BTE (behind-the-ear) hearing aids through ITE (in-the-ear) hearing aids to the smallest CIC (Completely In the Channel) hearing aids with fast data transmission. The multi-value modulation techniques (QAM, QPSK) necessary for this however require the transmitter and receiver oscillator frequencies to correspond to an accuracy of <+/−0.1%.

The data speeds that have been possible to achieve heretofore without frequency-stable components are around 100 bit/s for transmissions known as ear-to-ear connections. Higher data speeds require frequency-stable components such as quartzes, SAW (Surface Acoustic Wave components), ceramic resonators or micro-electromechanical structures (MEMS). The audio data is then generally transmitted to supplementary hearing aid adapters. In the case of ITE or CIC hearing aids there are currently no solutions with a high data speed (>40 kbit/s).

U.S. Pat. No. 6,839,447 describes radio transmission methods (DSSS, FHSS), which are used in commercial radio networks (GSM, DECT, WLAN, Bluetooth), and demonstrates corresponding hearing aid applications. A technique known as "clock retrieving" is described specifically there, where the symbol clock is restored for the synchronous transfer of the demodulated data. An "RF carrier recovery" method is also presented, according to which a carrier frequency is restored, e.g. for coherent demodulation. These methods only function reliably, however, only if a stable basic clock pulse is already available in the hearing aid. Otherwise the synchronization of two independent hearing aids would be extremely unreliable and susceptible to faults. Therefore the frequency-stable components described above, such as quartzes, are generally used. This is even more the case for frequency bands in the region of more than 200 MHz. The frequency-stable components used, however, have the disadvantage of high power consumption and large bulk, which is unacceptable for ITE hearing aids in particular.

SUMMARY OF THE INVENTION

An object of the present invention is to reduce the power consumption and bulk of components required for a fast, wireless data transmission, such that such a data transmission is also feasible for in the ear and CIC hearing aids in particular.

According to the invention this object is achieved by a hearing device, in particular a hearing aid, with a data transmission unit to receive a synchronization signal and an oscillator unit to clock the data transmission unit, with the oscillator unit having a free-running oscillator and a correlation unit being connected to the data transmission unit, such that the correlation unit can be used to correlate a predefinable reference signal to the synchronization signal and the free-running oscillator can be retuned based on the correlation result.

Because of the retunable, free-running oscillator, there is advantageously no need for a frequency-stable component, which means that both the bulk and the power consumed for data transmission purposes can be significantly reduced.

Switchable capacitors preferably are connected to the free-running oscillator to retune said oscillator. This allows automatic retuning to be achieved in a simple manner. Alternatively retuning can also be realized by means of the charging current used for the capacitor.

If the hearing device is configured in a digital manner, the synchronization signal can be a cyclically recurring burst. Such a burst, which has a long signal sequence, the autocorrelation function of which has extreme pulse compression, can be detected with a high level of reliability at the receiver.

In a specific embodiment the free-running oscillator can be retuned with each burst. This is necessary particularly when relatively large fluctuations of the free-running oscillator are anticipated.

If the hearing device is configured in an analog manner, the synchronization signal can comprise a cyclically recurring chirp. Such chirps are also particularly well suited to recognition.

In a further preferred embodiment, the oscillator unit has a counting unit to generate a counting signal between two synchronization signals and a storage unit to store a frequency characteristic, such that a direct or indirect frequency can be defined from the counting signal, to which the free-running oscillator has to be tuned. This counting method allows the oscillator to be retuned very precisely. It is favorable here if a look-up table is stored in the storage unit, from which the connection and disconnection of capacitors can be defined as an indirect measure of frequency via the counting signal. It can therefore be determined very quickly from the counting signal how the oscillator has to be retuned with the capacitors, such that the corresponding frequency is set.

DESCRIPTION OF THE PREFERRED EMBODIMENTS

The exemplary embodiment described in more detail below represents a preferred embodiment of the present invention.

Figure 1:
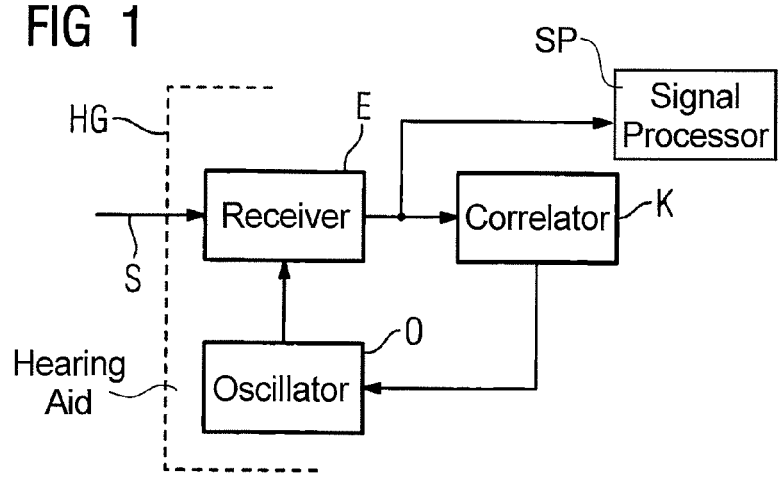
FIG. 1 shows a basic circuit diagram of a data transmission element of a hearing device in accordance with the invention.

According to FIG. 1 a hearing aid HG has a free-running oscillator O, which can be retuned via the supply voltage or switchable capacitors. In the case of digital hearing aids this oscillator O supplies the basic clock pulse for signal processing.

To retune the oscillator, an external transmitter cyclically transmits short burst signals, which are simple to modulate (e.g. FM, OOK, ASK, FSK) and can even be definitively modulated if there is a poor correspondence between the transmitter oscillator and the receiver oscillator in the hearing aid. Each burst has a long signal sequence, the autocorrelation function of which has extreme pulse compression—as mentioned above.

If the hearing aid HG or the hearing device has an analog structure, signals called chirps, known from radar technology, which allow a high pulse compression, can be used for the synchronization signal S. Chirps are sinus bursts with a continuous sweep between two frequencies. Pulse compression, with which the energy of the signal is essentially compressed into pulses, takes place in the receiver by means of a dispersive filter, in which the low-frequency signals are delayed for longer than the high-frequency signals, i.e. signal transmit time is a function of frequency. This produces a high level of local resolution of the signals.

Digital bit sequences with high pulse compression are for example known with radio transmission according to IEE802.11x (WLAN). They are used here to spread the transmit energy over a wide frequency band, so that narrowband interferences cannot influence data security. A digital correlator ensures pulse compression in the receiver.

These methods are used according to the invention in the hearing aid to eliminate the need for a frequency-stable component, e.g. a quartz component. The burst signals transmitted cyclically from the transmitter to the hearing aid HG hereby arrive in a time interval, which is derived directly from the frequency of the transmitter-oscillator, at a receiver E. For example the transmitter transmits one burst every 10,000 oscillator periods. The burst compression makes it possible to determine the time of arrival of the periodically transmitted bursts very precisely in the receiver, e.g. +/−5 periods of the receive oscillator or +/−0.05% of the burst repeat period. If in the simplest instance the nominal oscillator frequencies of the transmitter and receiver are set the same, a counter clocked by the receive oscillator would indicate an increase in the counter reading of 10,000+/−5 between two bursts in the case of frequencies with a good degree of correspondence. If the receive oscillator were 1% ahead compared with the transmit oscillator, the increase in the counter reading would result in a value of 10,100+/−5. If the receive oscillator were 1% behind, a value of 9,900+/−5 would result.

The output of the receiver E is supplied to a signal processor SP in the hearing aid HG. The synchronization signal S allows synchronized operation of that signal processor SP with another signal processor in another hearing aid in a binaural hearing system, of which the hearing aid HG is a component.

If the receiver oscillator can be retuned, as mentioned above, the oscillator frequency of the receiver E can be matched to that of the transmitter with the aid of this counter result and a frequency characteristic (look-up table) stored in the hearing aid. In the above example this is possible with a basic accuracy of +/−0.05%. This correction is updated with every new burst, such that the two frequencies do not drift apart again. As soon as the synchronization of the oscillators is stable, higher data speeds can be transmitted between bursts with carriers with multi-value modulation.

Figure 2:
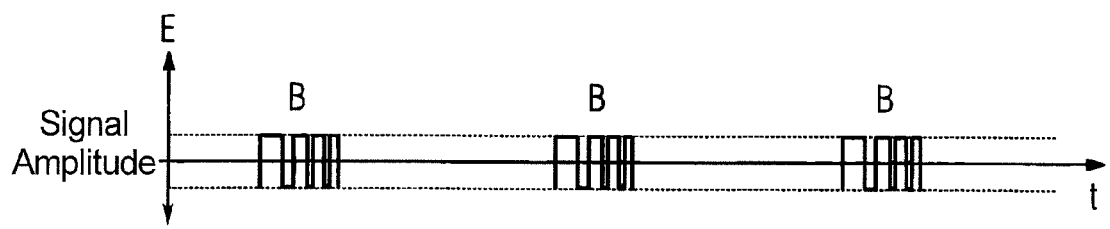
FIG. 2 shows a synchronization signal for use in the hearing device in accordance with the invention.
Figure 3:
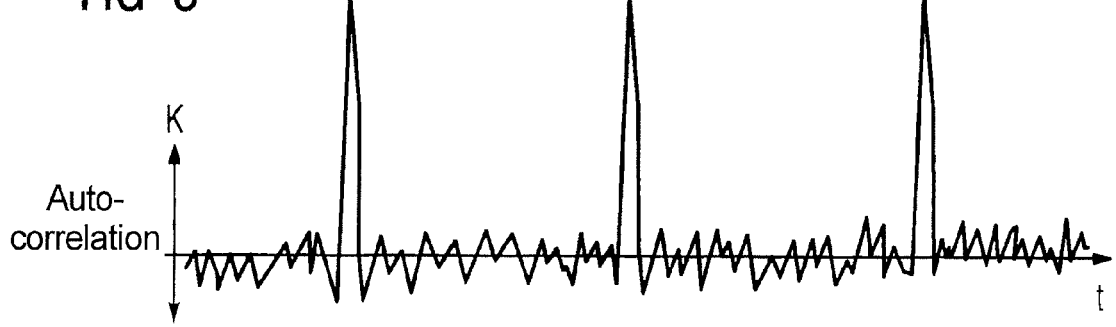
FIG. 3 shows an auto-correlated output signal of the correlator to synchronize a free-running oscillator in accordance with the invention.

In the example described in FIGS. 2 and 3 a burst compression is described with a digital signal sequence in the Barker code of length 11. As soon as the bit sequence corresponds to the correlation sequence +1, +1, +1, −1, −1, −1, +1, −1, −1, +1, −1, the auto-correlator K generates a sharp pulse of signal height 11. A transmission with a number of successive digital burst sequences B takes place for this purpose. After demodulation in the receiver E the demodulated signal is auto-correlated in the correlator K. At the time of receipt of a burst sequence the correlator signal increases very significantly, as shown in FIG. 3. This signal then starts the above-mentioned counter, such that a specific number results until the next burst sequence, with which an activation signal can be obtained from the look-up table for the capacitors to be connected or disconnected. Thus the oscillator can be retuned based on the time interval between two burst sequences.

Although modifications and changes may be suggested by those skilled in the art, it is the intention of the inventors to embody within the patent warranted hereon all changes and modifications as reasonably and properly come within the scope of their contribution to the art.

We claim as our invention:

1. A hearing device in a binaural hearing system in wireless communication with another hearing device in the binaural hearing system, said hearing device and said another hearing device using a synchronization signal to synchronize operation of the hearing device and said another hearing device, said hearing device comprising:
    a signal processor that supplies a processor output for conversion into an audio output;
    a receiver connected to the signal processor, said receiver receiving said synchronization signal;
    an oscillator unit connected to the receiver to clock the receiver, said oscillator unit comprising a free-running oscillator; and
    a correlation unit connected to the receiver that correlates a predetermined reference signal with the synchronization signal to obtain a correlation result, said free-running oscillator being connected to the correlation unit through switchable capacitors operated by said correlation result to tune the free-running oscillator.

2. A hearing device in a binaural hearing system in wireless communication with another hearing device in the binaural hearing system, said hearing device and said another hearing device using a synchronization signal to synchronize operation of the hearing device and said another hearing device, said hearing device comprising:
    a signal processor that supplies a processor output for conversion into an audio output;
    a receiver connected to the signal processor, said receiver receiving said synchronization signal;
    an oscillator unit connected to the receiver to clock the receiver, said oscillator unit comprising a free-running oscillator;
    a correlation unit connected to the receiver that correlates a predetermined reference signal with the synchronization signal to obtain a correlation result, said free-running oscillator being connected to the correlation unit and supplied with said correlation result to tune the free-running oscillator; and
    said oscillator unit comprising a counter that generates a count between two synchronization signals, and a storage unit that stores frequency characteristics for said free-running oscillator respectively associated with different counts, and said free-running oscillator being tuned by selecting a frequency characteristic corresponding to said count.

3. A hearing device as claimed in claim 2 wherein said storage unit comprises a look-up table, and comprising switchable capacitors connected to said free-running oscillator, said switchable capacitors being selectively switched dependent on said count.

4. A hearing device in a binaural hearing system in wireless communication with another hearing device in the binaural hearing system, said hearing device and said another hearing device using a synchronization signal comprising a cyclically recurring burst to synchronize operation of the hearing device and said another hearing device, said hearing device comprising:

- a signal processor that supplies a processor output for conversion into an audio output;
- a digital receiver connected to the signal processor, said receiver receiving said synchronization signal comprising said cyclically recurring burst;
- an oscillator unit connected to the receiver to clock the receiver, said oscillator unit comprising a free-running oscillator; and
- a digital correlation unit connected to the receiver that correlates a predetermined reference signal with the synchronization signal comprising said cyclically recurring burst to obtain a correlation result, said free-running oscillator being connected to the correlation unit and supplied with said correlation result to tune the free-running oscillator.

5. A hearing device as claimed in claim 4 comprising tuning said free-running oscillator with each cyclically recurring burst.

6. A hearing device as claimed in claim 4 wherein said burst is coded according to the Barker code.

7. A hearing device in a binaural hearing system in wireless communication with another hearing device in the binaural hearing system, said hearing device and said another hearing device using a synchronization signal comprising a cyclically recurring chirp to synchronize operation of the hearing device and said another hearing device, said hearing device comprising:

- a signal processor that supplies a processor output for conversion into an audio output;
- an analog receiver connected to the signal processor, said receiver receiving said synchronization signal comprising said cyclically recurring chirp;
- an oscillator unit connected to the receiver to clock the receiver, said oscillator unit comprising a free-running oscillator; and
- an analog correlation unit connected to the receiver that correlates a predetermined reference signal with the synchronization signal comprising said cyclically recurring chirp to obtain a correlation result, said free-running oscillator being connected to the correlation unit and supplied with said correlation result to tune the free-running oscillator.

* * * * *